(12) United States Patent
Brantner et al.

(10) Patent No.: US 8,660,988 B2
(45) Date of Patent: Feb. 25, 2014

(54) FINE-GRAINED AND CONCURRENT ACCESS TO A VIRTUALIZED DISK IN A DISTRIBUTED SYSTEM

(75) Inventors: Matthias Brantner, Glattbrugg (CH); David Graf, Zurich (CH); Donald Kossmann, Zurich (CH); Tim Kraska, Zurich (CH)

(73) Assignee: 28msec Inc., Fremont, CA (US)

( * ) Notice: Subject to any disclaimer, the term of this patent is extended or adjusted under 35 U.S.C. 154(b) by 1019 days.

(21) Appl. No.: 12/350,197

(22) Filed: Jan. 7, 2009

(65) Prior Publication Data

US 2009/0177658 A1 Jul. 9, 2009

Related U.S. Application Data

(60) Provisional application No. 61/019,490, filed on Jan. 7, 2008.

(51) Int. Cl.
*G06F 17/30* (2006.01)
*G06F 7/00* (2006.01)

(52) U.S. Cl.
USPC .......................................... 707/610; 707/802

(58) Field of Classification Search
None
See application file for complete search history.

(56) References Cited

U.S. PATENT DOCUMENTS

| | | | |
|---|---|---|---|
| 5,581,753 A * | 12/1996 | Terry et al. | 1/1 |
| 5,737,514 A * | 4/1998 | Stiffler | 714/13 |
| 5,870,761 A * | 2/1999 | Demers et al. | 1/1 |
| 6,026,406 A * | 2/2000 | Huang et al. | 1/1 |
| 6,477,617 B1 * | 11/2002 | Golding | 711/112 |
| 7,043,478 B2 * | 5/2006 | Martin et al. | 707/704 |

FOREIGN PATENT DOCUMENTS

EP 420425 A2 * 4/1991

OTHER PUBLICATIONS

Plattner et al., "Ganymed: Scalable Replication for Transactional Web Applications," IFIP International Federation for Information Processing, 2004.*
Ali, Amer Abu, "On Optimistic Concurrency Control for Real-Time Database Systems," American Journal of Applied Sciences 3 (2), 2006.*

* cited by examiner

*Primary Examiner* — Kuen Lu
(74) *Attorney, Agent, or Firm* — Hickman Palermo Truong Becker Bingham Wong LLP

(57) ABSTRACT

A method for updating a block on disk is provided. The method involves one or more clients committing log records to queues corresponding to blocks. The method further involves checkpointing, which includes obtaining a flushing lock on the queue by a client, receiving log records from the queue, applying the log records to a block on disk, and deleting the log records from the queue. A block on disk may be updated by first applying the log records from a queue to a locally cached version of the block corresponding to the queue. The locally cached version may then be stored on the disk replacing the original block on disk or being stored as a new version of the original block.

40 Claims, 4 Drawing Sheets

FINE-GRAINED AND CONCURRENT ACCESS TO A VIRTUALIZED DISK IN A DISTRIBUTED SYSTEM

PRIORITY CLAIM

This application claims the benefit of priority from Provisional Patent Application No. 61/019,490 filed Jan. 7, 2008, entitled "PROTOCOLS TO SUPPORT FINE-GRAINED AND CONCURRENT ACCESS TO A VIRTUALIZED DISK IN A DISTRIBUTED SYSTEM"; the entire content of which is hereby incorporated by reference for all purposes as if fully disclosed herein.

FIELD OF THE INVENTION

This invention is related to data storage and retrieval. Specifically, this invention is related to fine-grained and concurrent access for data storage and retrieval.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The web has made it easy to provide and consume content of any form. For example, building a web block, starting a blog, and making both searchable for the public have become a commodity. Furthermore, large scale services such as photo sharing, video sharing, and social networking have become commonplace. These services all require basic ingredients such as storage, CPUs, and network bandwidth.

The goal of "utility computing" is to provide the basic ingredients of higher-level services as a commodity by specialized utility providers at low unit cost. Ideally, utility computing would provide full availability so that users can read and write data at any time without ever being blocked, with response times that are virtually constant and do not depend on the number of concurrent users, the amount of stored data, or any other system parameter.

One popular utility service in use today is simple storage service (S3) which provides a simple get and put interface in order to store and retrieve data. S3 provides the same functionality as a local disk, but is implemented on distributed hardware. Thus, clients using an S3 system interact with a "virtualized disk", rather than an actual disk. When clients use S3 to store data on the virtualized disk, the data may actually be stored in different buckets (e.g., servers or other data repositories). Within each bucket, the data is typically identified by a user assigned key.

Typically, utility services allow different clients to independently access and update the data stored on the virtualized disk. However, when using storage services such as S3, clients do not have the same consistency safeguards that are provided by other systems, such as database servers. For example, updates may not necessarily be applied in the same order as they were initiated. Without such consistency safeguards, there are many applications for which storage services would be inappropriate.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
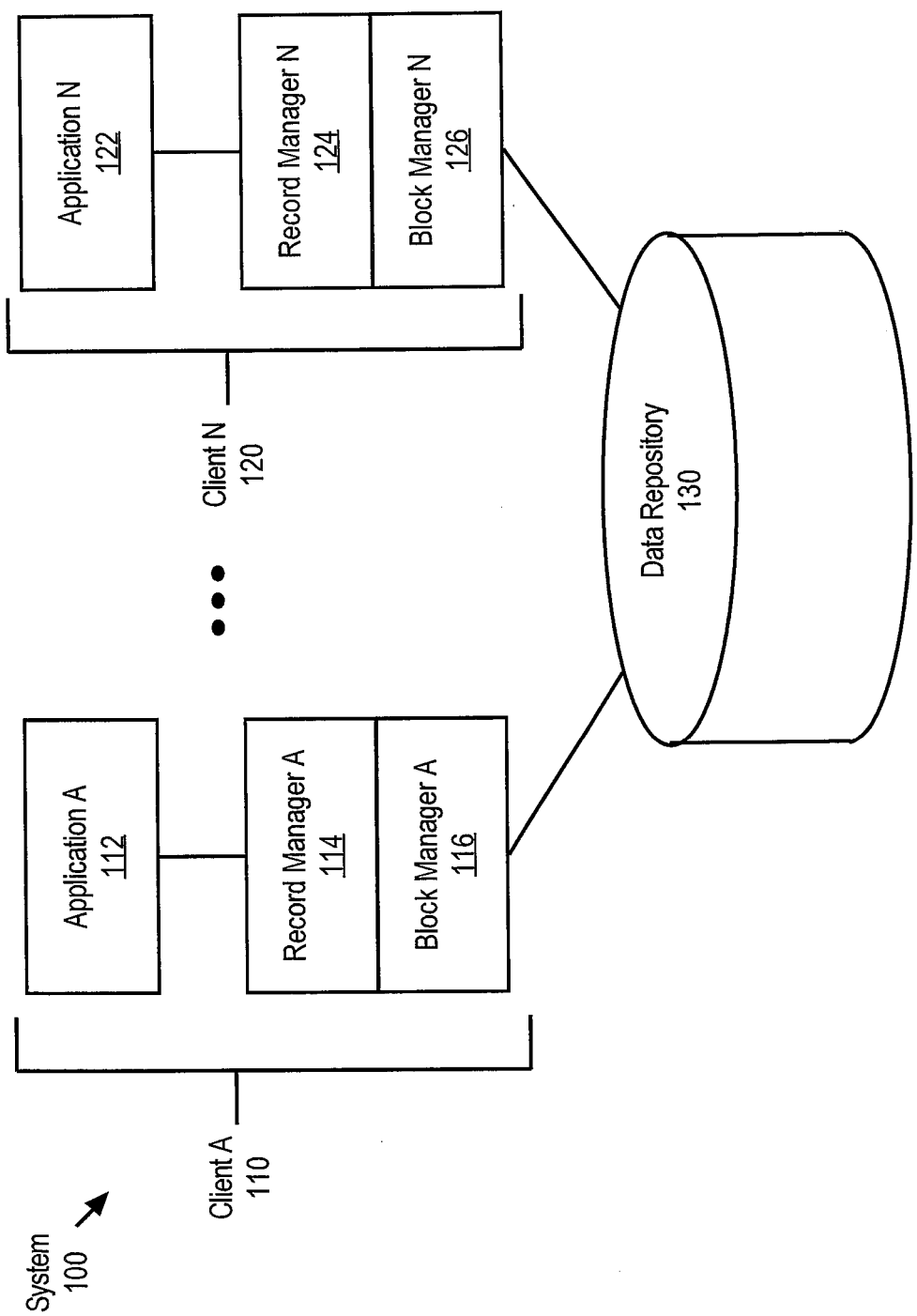
FIG. 1A is a block diagram illustrating an exemplary system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

A method and apparatus for updating data on a shared virtualized disk is provided. The techniques described herein may allow for preserving the scalability and availability of a utility storage system while achieving one or more ACID (i.e., Atomicity, Consistency, Isolation, Durability) properties typically associated with a database system. In particular, techniques are provided for guaranteeing certain consistency levels as clients independently read and write to a shared virtualized disk, while minimizing the overhead needed to achieve those consistency levels. The techniques may be used in any context in which entities read and write to the same storage or virtual storage, including but not limited to S3 environments.

In an embodiment, no centralized policing mechanism is used to manage the read and write operations of concurrently executing clients. Instead, the clients independently manage their own read and write operations. However, in performing their read and write operations, the clients follow a protocol which, when followed by all clients, ensures that the desired consistency level is achieved.

According to an embodiment, to write data to the shared virtualized disk, the clients that desire to write information to the shared virtualized disk commit log records to queues. Committing log records may include storing log records in a queue, where each log record includes data pertaining to one or more updates to records within a block corresponding to the queue. The method further involves checkpointing, which includes updating a block on disk based on the log records in the queue that are associated with the block and deleting the log records from the queue once applied to the block. A block on disk may be updated directly or by first applying the log records from a queue to a locally cached version of the block corresponding to the queue. The locally cached version may then be stored on the disk, replacing the original block on disk (or being stored as a new version of the original block). Flushing of a queue may involve flushing all the log records within a pending update queue, or simply flushing a portion of the log records within the pending update queue.

In an embodiment, a client checkpointing (or flushing) a queue, first obtains a flushing lock on the queue, thereby preventing other clients from concurrently flushing the queue. The flushing lock generally represents a lock on the queue that prevents another client (or process) from concurrently attempting to flush the queue. The flushing lock, however, may allow other clients to continue to read from and/or append log records to the queue.

Techniques are provided for handling situations in which, after a client initiates writing a plurality of log records to a queue, the client crashes prior to completing writing of the plurality log records to the queue. After restarting, the client re-initiates writing the entire plurality of log records, where at least one log record is written more than once to the queue.

In an embodiment, one client is able to flush the queue, while another client concurrently writes to the queue. The client flushing the queue may obtain a flushing lock prior to flushing the queue and release the flushing lock after flushing the queue. Flushing the queue by any client may be responsive to an occurrence of one or more of: a predetermined time from a previous flushing of the queue, a predetermined age of an oldest log record in the queue; a predetermined age of the last log record in the queue, or a predetermined size of the queue.

Although specific components are recited herein as performing the method steps, in other embodiments agents or mechanisms acting on behalf of the specified components may perform the method steps.

Basic System Architecture and Functionality

Although a specific computer architecture is described to perform the techniques described herein, other embodiments of the invention are applicable to any architecture that can be used to perform the steps described herein.

FIG. 1A shows an exemplary system (100) in accordance with one or more embodiments of the invention. As shown in FIG. 1A, the system includes one or more clients (e.g., client A (110) and client N (120)), and data repository (130). Depending on the application, the different components shown in FIG. 1A may be implemented by different hardware configurations. For example, one or more components, or subcomponents may be implemented on machines in a dedicated data center in a distributed manner. Another example may involve implementation of the different components shown on a single machine (e.g., desktop, laptop, hand-held devices, kiosks, etc.). Different clients may be connected to the data repository (130) over a network, where each of the clients may be implemented on different types of devices.

A client within the system (100) generally represents any entity that retrieves data from, updates data, or stores data to the data repository (130). For examples, a client may retrieve memory blocks from the data repository (130) based on blocks' URIs, buffer the blocks locally, update them, or write them back. As shown in FIG. 1A, each client may include a number of components such as an application (e.g., application A (112) and application N (122)), a record manager (e.g., record manager A (114) and record manager N (124)), and a block manager (e.g., block manager A (116) and block manager N (126)). In accordance with an embodiment, any number of concurrent clients may be supported within the system (100). In an embodiment, a client may fail without blocking an execution process by another client. In an embodiment, the clients may be stateless where failure of a client only results in a loss of the work by the client that has not been committed.

In an embodiment, the application within a client may generally represent any process, program, interface, etc. that requests data storage or retrieval. In an embodiment, the application may simply provide or obtain data from the record manager without regard to the management (e.g., storage, and retrieval) of the data.

In an embodiment, a record manager manages records (e.g., relational tuples, XML documents, or other suitable documents) within a collection (e.g., a set of one or more blocks). Each record within a block may be associated with a collection and further may be composed of a key and payload data. A key may be used to uniquely identify the record within the collection. Both the key and the payload data may be bytestreams of arbitrary length, where each record may be smaller than a unit of transfer (e.g., a block). A collection may be identified by a uniform resource identifier ("uri"). In an embodiment, the record manager may provide functionality to create new objects, read objects, update objects, scan collections, commit log records, or abort.

In an embodiment, a block manager implements a buffer pool for blocks from the data repository (130). The block manager may be configured for reading blocks from the data repository (130), pinning the blocks in the buffer pool, updating the blocks in the buffer pool, or marking the blocks as updated. The block manager may also be configured to create new blocks on the data repository (130). In an embodiment, the block manager may keep copies of blocks from the data repository in the buffer pool across transactions. Transactions are defined as a sequence of read, update, and create requests between two commit or abort calls, described below.

In one or more embodiments of the invention, the data repository (130) corresponds to any data storage device (e.g., a distributed storage service such as S3), local memory on the same machine as a client itself, multiple servers connected over the internet, systems within a local area network, a memory on a mobile device, etc.) known in the art. In one or more embodiments of the invention, access to the data repository (130) may be restricted and/or secured. As such, access to the data repository (130) or portions (e.g., a block) of the data repository (130) may require authentication using passwords, secret questions, personal identification numbers (PINs), biometrics, and/or any other suitable authentication mechanism. Those skilled in the art will appreciate that elements or various portions of data stored in the data repository (130) may be distributed and stored in multiple data repositories (e.g., servers across the world). In one or more embodiments of the invention, the data repository (130) includes flat, hierarchical, network based, relational, dimensional, object modeled, or data files structured otherwise. For example, data repository (130) may be maintained as a table of a relational database. In addition, data in the data repository (130) may be verified against data stored in other repositories.

Pending Update Queues

According to one embodiment, blocks within the data repository (130) have corresponding pending update queues ("PU queues"). To make a change to a block within the data repository (130), a client does not directly update the block. Instead, the client appends a log record onto the end of the PU queue for the block. The log record contains data that indicates the specific change for a particular record within a block and identifies the particular record by a key value of the particular record desired by the client. For example, a log record may be based on physical logging or logical logging. Log records based on physical logging include the actual value to be stored at a record in the block to which the log record is applied. For example, a physical log record may include a value of 10, where 10 is stored as the new value of the record within the block. Log records based on logical logging include a function to be applied to the current value of the record within the block, where the resulting value is stored as the new value of the record within the block. For example, a logical log record may include multiplication by 5. In this example, an original value stored in the corresponding record within the block is multiplied by 5 and the resulting value overwrites the value originally stored in the record within the block.

Figure 1B:
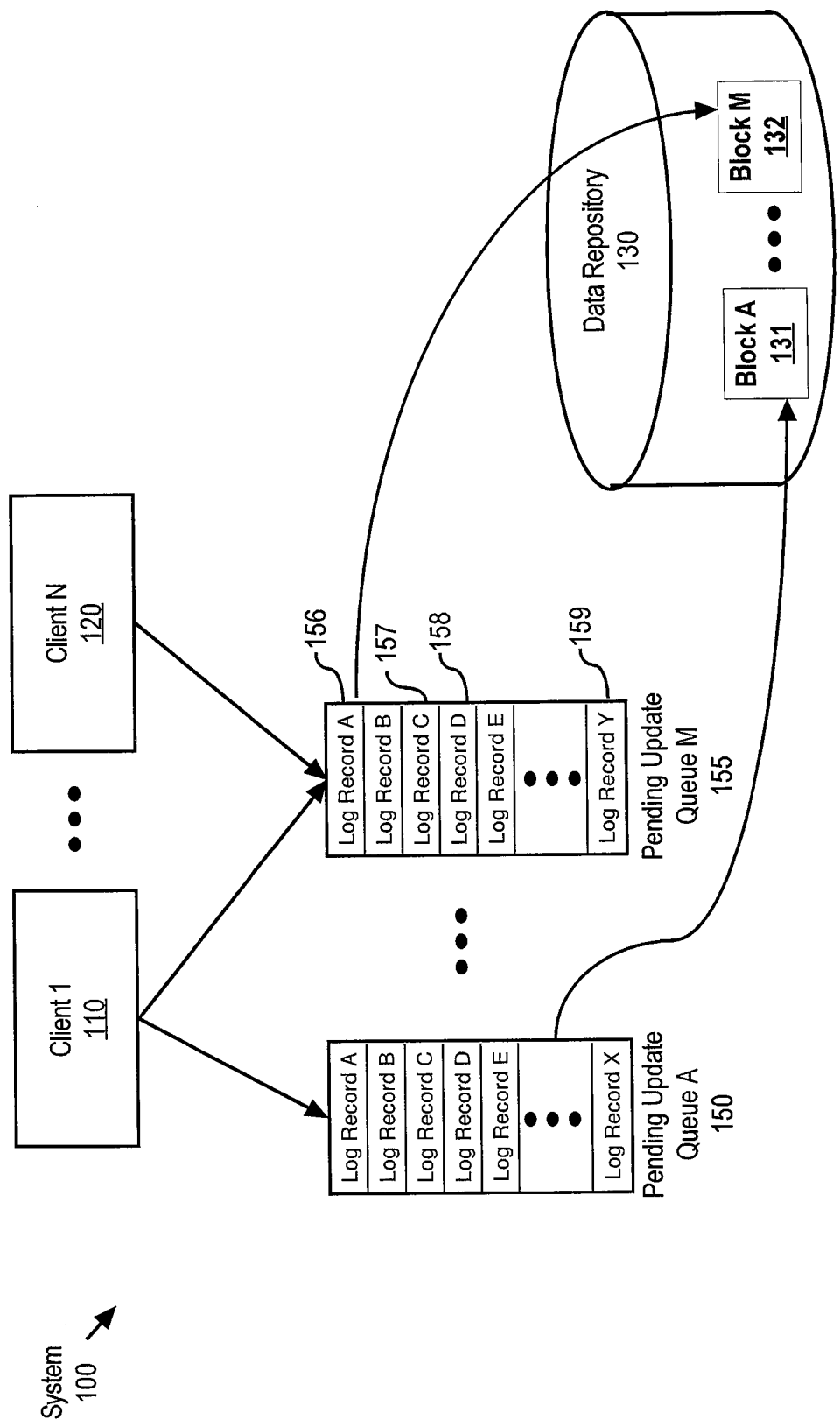
FIG. 1B is a block diagram illustrating how an example of clients use queues for adding, updating, or deleting data in a data repository, in accordance with one or more embodiments.

A PU queue may be maintained on volatile or non-volatile memory. A PU queue maintained on non-volatile memory (e.g., the data repository (130)) is not lost during a crash of a system maintaining the PU queue. FIG. 1B illustrates queues (e.g., pending update (PU) queue A (150) and PU queue M (155)) for adding, updating, or deleting data in the data repository (130) in accordance with an embodiment of the invention. The PU queues each correspond to a unit of storage, e.g., a block, within the data repository (130). Thus, queue A (150) corresponds to block A (131), and queue M (155) corresponds to block M (132).

Although multiple queues are shown where each queue corresponds to a unit of transfer, one or more embodiments may be implemented with a single PU queue for multiple log records over different blocks or more than a single unit of storage. Each log record (e.g., log record A (156) through log record Y (159)) in a PU queue may include one or more pending updates that are to be applied to a block on the disk (or local copies of the corresponding blocks stored at a client which are to be written to the disk overwriting the original block on disk).

Committing

Storing data to the data repository (130) involves at least two steps: (1) committing and (2) checkpointing (also referred to as carrying out checkpoints). Committing involves a client generating log records which include updates to records within a block that are committed as part of a transaction and sending the log records to a queuing system (e.g., PU queue A (150) and PU Queue M (155)). Sending the log records to a queuing system involves appending the log records to a PU queue corresponding to the block which includes the record for which the log record is applicable to. The log records within the PU queue may be appended to the PU queue in the order in which they are received at the PU queue. Furthermore, the log records within the PU queue may be checkpointed (described below) in the same order as they are received. Accordingly, the PU queues are used in a first-in-first-out (FIFO) manner.

If a client crashes during committing, then the client restarts and resends all log records after restarting. Resending all log records may result in a single log record being sent twice to a PU queue. However, in an embodiment, the log records are idempotent, and therefore, log records may be applied twice to a block with the identical result as if applied once. For example, in the case of log records based on physical logging, as described above, a log record may be sent multiple times to the PU queue because the same value in the log record will be written to the record within the block during checkpointing. In another example involving logical logging, a record header of a record within a block may include a history of log records that have been applied to the record. The history of the log records may be checked prior to applying a log record so that a log record that is committed twice to the PU queue is not applied more than once to the record in the block during checkpointing.

In another example, if a client crashes completely during commit and never comes back or loses uncommitted log records, then some of the log records of the commit may get applied (before the failure) and other log records of the commit may never be applied potentially violating atomicity, described further below.

Checkpointing

As described above, the second step of storing data (e.g., updating, adding, or deleting records in a collection) to the data repository involves checkpointing. Checkpointing, as used herein, is the process of flushing updates (e.g., log records) in a PU queue to a block.

The entity or entities that perform checkpointing may vary from implementation to implementation. For example, in one embodiment, checkpointing is performed by the clients themselves. In such an embodiment, checkpointing for a block may be carried out by a client that reads log records from the queue (i.e., a reader), or a client that writes log records to the queue (i.e., a writer). For example, when a client accesses the PU queue to complete a read or write, the client may evaluate the PU queue to determine if the checkpoint criteria (described below) is met and initiate checkpointing of the PU queue.

In other embodiments, checkpointing may be carried out by non-client entities. For example, checkpointing may be carried out by a process which periodically checks the queue, an owner that is specifically assigned the queue for checkpointing, or another suitable entity. An entity that is performing a checkpointing operation for a block is referred to herein as a "checkpointing entity".

Figure 2:
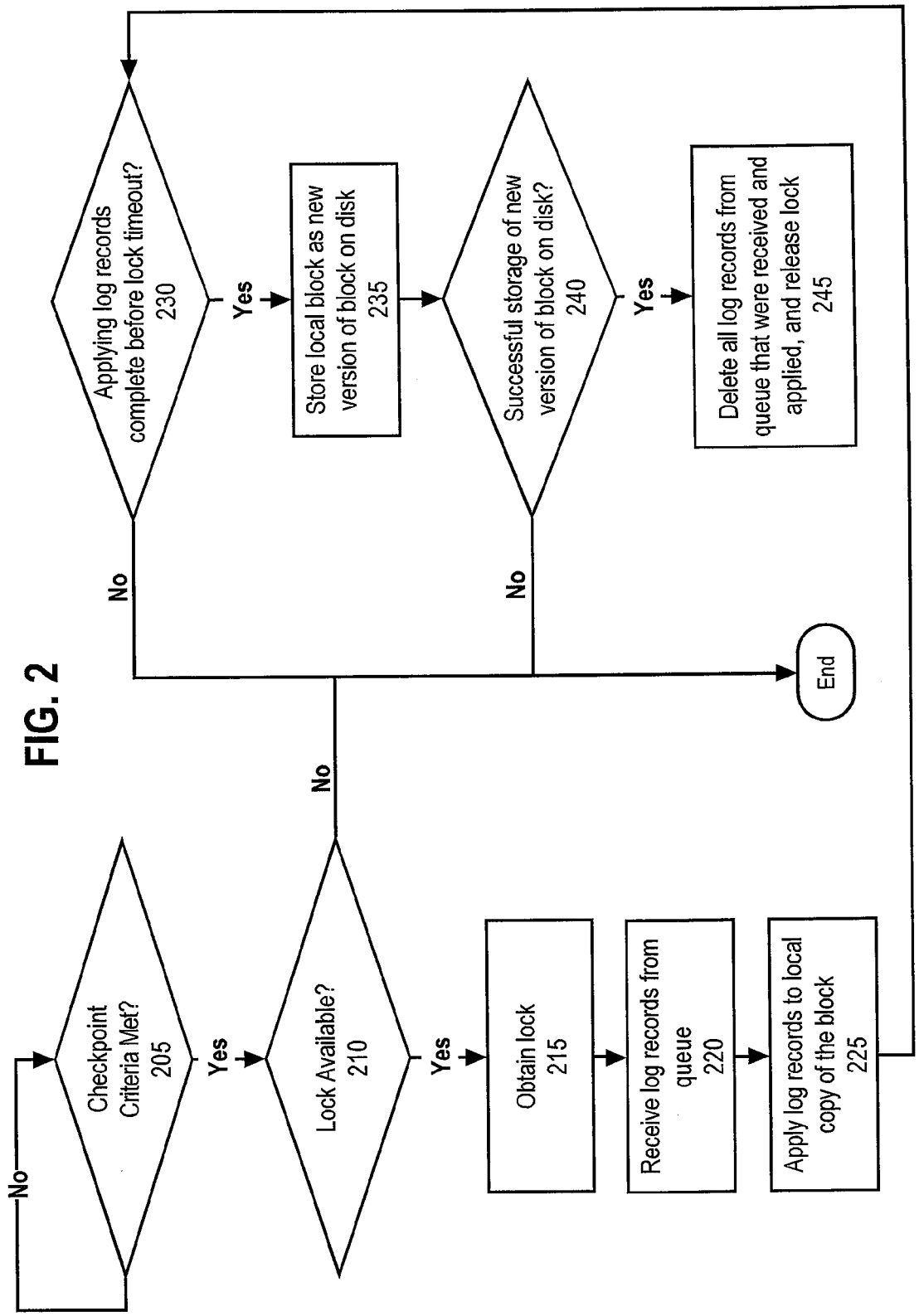
FIG. 2 is a flow diagram illustrating an embodiment for checkpointing update log records, in accordance with one or more embodiments.

FIG. 2 shows a flow chart for a possible implementation of checkpointing update log records, which are modifications to existing records within a block of memory. In one or more embodiments, one or more of the steps described below may be omitted, repeated, and/or performed in a different order. Accordingly, the specific arrangement of steps shown in FIG. 2 should not be construed as limiting the scope of the invention.

Initially, a determination is made by the checkpointing entity whether the checkpoint criteria is met (Step 205). For the purpose of explanation, it shall be assumed that the checkpointing entity is a client. The client that is performing the checkpointing shall be referred to hereafter as the "checkpointing client". The checkpoint criteria may static or dynamic (e.g., configured by a user, set by an administrator, hardwired onto the disk, etc.). The checkpoint criteria may be based on an occurrence of one or more of:

a predetermined time from a previous flushing of a PU queue,
 a predetermined age of an oldest log record in PU queue,
 a predetermined age of a most recent log record in the PU queue, or
 a predetermined size of the PU queue, or These checkpoint criteria are merely exemplary. The actual checkpoint criteria used by the checkpointing entity may vary from implementation to implementation.

In order to make the determination, the checkpointing client needs to obtain the information required to make the determination. For example, assume that the checkpointing criteria is that the oldest log record is more than 24 hours old. Under these conditions, the checkpointing client will make calls to obtain the timestamp of the oldest log record in the PU queue, compare that timestamp with the current time, and thereby determine whether the oldest log record in the PU queue is older than 24 hours. Evaluation of the checkpoint criteria is repeated until the checkpoint criteria is met.

After the checkpoint criteria is met, a determination is made whether a flushing lock is available for the PU queue that is intended to be flushed (Step 210). The flushing lock for the PU queue generally represents an exclusive lock that may be obtained by a client or another entity for flushing a portion of the log records or all of the log records in the PU queue. If the flushing lock is available, the entity requesting the flushing lock may gain the flushing lock, thereby allowing exclusive capability for the entity to flush the PU queue until the lock is released (Step 215). While one client or entity has the flushing lock for a PU queue, no other clients or entities may flush the PU queue. However, when one client or entity has the flushing lock for a PU queue, other clients may continue to read from the PU queue, and furthermore may continue to append log records to the PU queue (write to the PU queue). In an embodiment, after a client obtains a flushing lock on a PU queue, the client only flushes the log records in the PU queue that were present when the flushing lock was obtained. Thus log records added by other clients, after the flushing lock is obtained by a client, may simply be retained in the PU queue for the next flushing of the queue. Implementation of the flushing lock prevents multiple clients from concurrently flushing the PU queue. In an embodiment, a need for locking the PU queue may be avoided if a single entity (e.g., a particular node or client) is designated to always carry out the checkpoint for the particular PU queue.

Once a flushing lock is obtained, a "flushing-batch" of log records from the PU queue are obtained by the checkpointing client (Step 220). In an embodiment, the flushing-batch may include all or a portion of the log records that are in the PU queue at the time the batch is established. After the flushing-batch is established, clients may add more log records to the PU queue (the flushing lock does not block clients from writing to the PU queue). However, those subsequently-written log records may not necessarily become part of the current flushing-batch.

In an embodiment, there may be an upper bound (e.g., 256) on the number of log records that are included in any given flushing-batch. For example, the number of log records in a flushing-batch may be limited to the N oldest log records in the queue, where N is determined based on a user configuration or based on a time period of the flushing lock needed to flush the queue. In an embodiment, a flushing lock may automatically expire after a predetermined time period to avoid an entity or client from indefinitely holding the flushing lock. The number of log records that are in the flushing-batch may be determined based on the predetermined time period before expiration of the flushing lock. For example, if the flushing lock is only available for short periods of time, the flushing-batch may be limited to a small number in order to prevent the flushing lock from prematurely timing out before a checkpointing client can apply the log records that belong to the flushing-batch.

Next, the log records in the flushing batch are applied by the checkpointing client that holds the flushing lock on the queue, to a local copy of the block (Step 225). Typically, the local copy will reside in the volatile memory of the computer upon which the checkpointing client is executing.

If a local copy is not available to the checkpointing client, then the local copy of the block may be obtained by the checkpointing client from the data repository. Furthermore, if the block on the disk was modified after the local copy was cached, then the local copy may be "stale". When the local copy is stale, the checkpointing client obtains another copy of the block.

In an embodiment, applying the flushing-batch to the local copy of the block may involve a logical and/or value based modification to a record. For example, a current value of a record may be modified by applying a formula to the current value and replacing the current value with the result of applying the formula. Another example may involve simply replacing the current value in a record with a new value in the log record. In an embodiment, a data block may be split because the number of records have grown to a size larger than the block size. For example, splitting blocks may be carried out using replicated indexes so that readers are not blocked while the block is split.

If applying the log records is not completed before a timeout of the flushing lock (Step 230), then the process is terminated without storing the local copy of the block onto the disk. If applying the log records is completed before a timeout of the flushing lock, then the local copy of the block is stored to the disk replacing the corresponding block already on the disk (Step 235).

Next, a determination is made whether the checkpointing client has successfully completed storing the local copy of the block onto the disk (Step 240). If the storing of the local block on the disk is successful, then the flushing-batch of log records that were received from the PU queue in Step 220 have been properly applied to the corresponding block. Accordingly, the log records that have been applied to the block are deleted from the PU queue and the flushing lock on the PU queue is released (Step 245).

Crash Recovery

In an embodiment, a checkpointing client may crash or otherwise fail anytime during the checkpointing process described above. For example, the checkpointing client may fail while receiving log records from the queue (Step 220), applying log records to the local copy of the block (Step 225), or storing the local block as a new version of the block on the disk (Step 235).

If the checkpointing client fails while receiving log records from the queue or while applying log records to the local copy of the block, the flushing lock, that was obtained by the checkpointing client in Step 215, will eventually time out and the flushing lock on the queue will be released without the queue being modified and without the log records in the queue being applied to the corresponding block on the disk. Thereafter, another client or the same client upon restarting may initiate the checkpointing process for flushing the PU queue from the start.

If the checkpointing client fails after updating the local block but before storing the local block as a new version of the block on the disk, no part of the local block will be stored on the disk, as the step of storing the local block on the disk is completed while maintaining atomicity. Maintaining atomicity will ensure that either all of the local block is stored onto the disk or none of the local block is stored onto the disk. In this scenario, the flushing lock for the PU queue will time out without modification of the PU queue or the block in memory. Thereafter, another client or the same client upon restarting may initiate the checkpointing process for flushing the PU queue from the start.

If the checkpointing client fails after storing the local block as a new version of the block on the disk but before releasing the flushing lock and deleting the flushing-batch of log records from the PU queue, the flushing-batch of the log records may be applied again to the block. Mechanisms for ensuring that the log records are not applied again may be implemented. For example, the records within a block may include timestamps or otherwise identify log records that have been applied to the block.

Handling Inserts and Deletes

In addition to the PU queues for updating records within a block, one or more embodiments may use special PU queues for inserting or deleting records from memory blocks. Although, many different implementations may be used for the organization of memory blocks and the insertion and deletion of records within the memory blocks, the embodiment described below is based on organizing memory blocks into the leaf nodes of an "index-organized table", where each index-organized table is associated with a special PU queue for insert log records and delete log records which are used to insert and delete records, respectively, in the memory blocks.

Each of the leaf nodes of the index-organized table is associated with a memory block that includes at least one record and is further limited to a finite number of records (generally the number of records that a block or page can hold). Accordingly, if all the records within the block are deleted, the leaf node is also deleted. Furthermore, if a block already includes the maximum number of records and another record is to be added to the block based on a key value of the record, then the records within the block must be split into multiple blocks in multiple corresponding leaf nodes (new leaf nodes created) in the index-organized table.

In an embodiment, a deletion of a record from a block stored at a leaf node of an index-organized table involves first committing a delete log record by a client to the special PU queue associated with the index-organized table. The delete log record identifies the key value of the record in the block that is to be deleted. Thereafter, during checkpointing of the special PU queue, the checkpointing entity obtains a flushing lock on the special PU queue associated with the index-organized table and traverses the index-organized table to identify the block with the record that is to be deleted based on the key value in the delete log record. After deletion of the record, the block is checked to ensure that at least one record remains in the block. If no records remain in the block after deletion of the record, then the leaf node with the block is to be deleted from the index-organized table. Furthermore, the predecessor node(s) of the deleted leaf node are also deleted, in a bottom up sequence starting from the deleted leaf node, until a predecessor node is identified that has at least one other successor node.

In an embodiment, an insertion of a record into a block stored at a leaf node of an index-organized table involves first committing an insert log record by a client to the special PU queue associated with the index-organized table. The insert log record includes a key value for the new record and the payload or data value of the new record. Thereafter, during checkpointing of the special PU queue, the checkpointing entity obtains a flushing lock on the special PU queue associated with the index-organized table and traverses the index-organized table to identify the block that is most suitable to add the new record based on the key value in the insert log record. If a block in a leaf node already has the maximum number of records, the leaf node is split into multiple leaf nodes and data from the block is split into the multiple blocks on the multiple leaf nodes. Thereafter, the new record may be added to the appropriate block.

After flushing of the special PU queue, involving the application of the insert log records and the delete log records to corresponding blocks in memory, the insert log records and the delete log records are deleted from the special PU queue.

Concurrent Access Example

Returning to FIG. 1B, consider an example involving the flushing of PU queue M (155), which does not limit the scope of the invention. In this example, both client 1 (110) and client N (120) write to the PU queue M (155) corresponding to a block on the data repository (130), where both client 1 (110) and client N (120) may each cache a local copy of the block from the disk. Initially, log record D (158) through log record Y (159) are each committed to the PU queue (159), where a portion of the log records are committed by client 1 (110) or the remaining portion of the log records are committed by client N (120). Thereafter, Client N (120) obtains a flushing lock on the PU queue M (155) and subsequently obtains the log records (log record D (158) through log record Y (159). While client N (120) is flushing the queue by applying log record D (158) through log record Y (159) to the corresponding block (or copy of the block in local memory at client N (120)), client 1 concurrently commits additional records (e.g., log record A (156)) and reads records from the PU queue M (155) (e.g., log record D (158)). After client N (120) completes applying log record D (158) through log record Y (159), client N (120) deletes log record D (158) through log record Y (159) from PU queue M (155) and furthermore, releases the flushing lock. Accordingly, log record D (158) through log record Y (159) which were each committed by one of client 1 (110) and client N (120), are checkpointed by client N (120) and log record A (156) through log record C (157) remain in the PU queue M (155) to be applied at the next flushing of the PU queue M (155).

Consistency Levels

As mentioned above, techniques are provided for ensuring certain levels of consistency in environments where multiple entities (clients) independently read and write to shared storage. One such level of consistency is referred to as "eventual consistency". Eventual consistency guarantees that every update that an entity makes will eventually be seen by other entities unless a subsequent update overwrites that update. Eventual consistency is ensured through the use of a "basic commit protocol" that is described above.

Another level of consistency is "atomicity." Atomicity generally represents the requirement that all or none of the updates of a transaction are applied to a block on disk or become visible. In an embodiment, atomicity may be implemented using additional atomic queues. For example, each client may maintain an atomic queue for all transactions performed by the client or even an atomic queue per transaction performed by the client. The client commits log records to the atomic queue instead of directly committing to the PU queue described above.

Once the client has written all log records of the transaction to its atomic queue, the client sends a special commit(id) record to atomic queue, thereby using the same id as in each of the log records for the transaction. In the commit record, the client may also indicate the number of log records that were committed for the transaction so that the log records can all be recovered more safely from the atomic queue in case of failure of the client. After the commit record for a transaction is committed, all the log records for the transaction are submitted from the atomic queue to the pending update queue. If a client fails at any point, the client checks the atomic queue associated with the client at restart. Log records in the atomic queue that have the same id has a commit record are considered safe, as this indicates that all log records for the transaction have been committed to the atomic queue because the commit record is the last record committed for each transaction. Accordingly, at restart of a client following failure, the safe log records (which may or may not have already been submitted) are submitted to the PU queue. The safe log records are then deleted from the atomic queue. The log records in the atomic queue that do not share the same id has a commit record are considered unsafe, as this indicates that some log records for the transaction may not have been committed. Accordingly, at restart of a client following failure, the unsafe log records are deleted and never submitted to the PU queue.

Another level of consistency is referred to herein as "monotonic read consistency". Monotonic read consistency provides that if a client reads the value of a data item, any successive read operation on the data item by that client will always return the same value or a more recent value. Monotonic read consistency may be implemented by keeping a record of the highest commit timestamp for each page which a client has cached in the past. If the client receives an old version of a page from the disk (older than a version the client has seen before), the client rereads the page from the disk.

Another level of consistency is referred to herein as "read your writes" which provides that the effect of a write operation by a client on a data item will always be seen by a successive read operation on the data item by the same client. This level of consistency is automatically provided if monotonic read consistency is implemented.

Another level of consistency is referred to herein as "write follows read" which provides that a write operation by a client on a data item following a previous read operation on the data item by the same client is guaranteed to take place on the same or a more recent value of the data item that was read. This property is automatically fulfilled because writes are not directly applied to data items but rather via a pending update queue.

Another level of consistency is referred to herein as "monotonic write consistency". Monotonic write consistency provides that a write operation by a client on a data item is completed before any successive write operation on the data item by the same client. Monotonic write consistency may be implemented by establishing a counter (or timestamp) for each page (or index) at a client and incrementing the counter whenever the client commits an update to that page (or index). The pairs (client id, counter value) of the latest updates of each client are stored in the header of each page and in the log records. As a result, the log records can be ordered during checkpointing and out of order log records that are detected during checkpointing can be deferred to the next checkpoint.

Another level of consistency is referred to herein as "snapshot isolation". Snapshot isolation serializes transactions in the order of the time they started. Snapshot isolation may be implemented using a timestamp at the beginning of a transaction. Thereafter, with every read of a data item, the time stamp of the read is compared to the timestamp of the beginning of the transaction to ensure that version of the data item being read precedes or is equal to the beginning of the transaction. If the timestamp of the version read is subsequent to the beginning of the transaction, then the undo log records are used to return to the same state as at the beginning of the transaction. Furthermore, before a write set for a first transaction is committed, the write set of a second transaction that started after the first transaction but is already committed is compared to the write set of the first transaction to ensure that there are no overlapping log records that are updates to the same record. Accordingly, multiple transactions that have an overlapping write set only commit in the same order that the multiple transactions began.

Another level of consistency is referred to herein as backward-oriented concurrency control (BOCC). BOCC supports serializability similarly to snapshot isolation. However, BOCC relies on a comparison of the read set of a first transaction to the write set of previously committed transactions that were committed after the read set of the first transaction is read. The read set of the first transaction is compared to the write set of previously committed transaction when the write set of the first transaction is generated from the read set of the first transaction and ready to be committed. If referenced records in the write set of the previously committed transaction overlaps with the referenced records in the read set of the first transaction, the write set of the first transaction is discarded without committing. However, if the read set of the first transaction does not overlap with the write set of the previously committed transaction, then the write set of the first transaction is committed.

Hardware Overview

Figure 3:
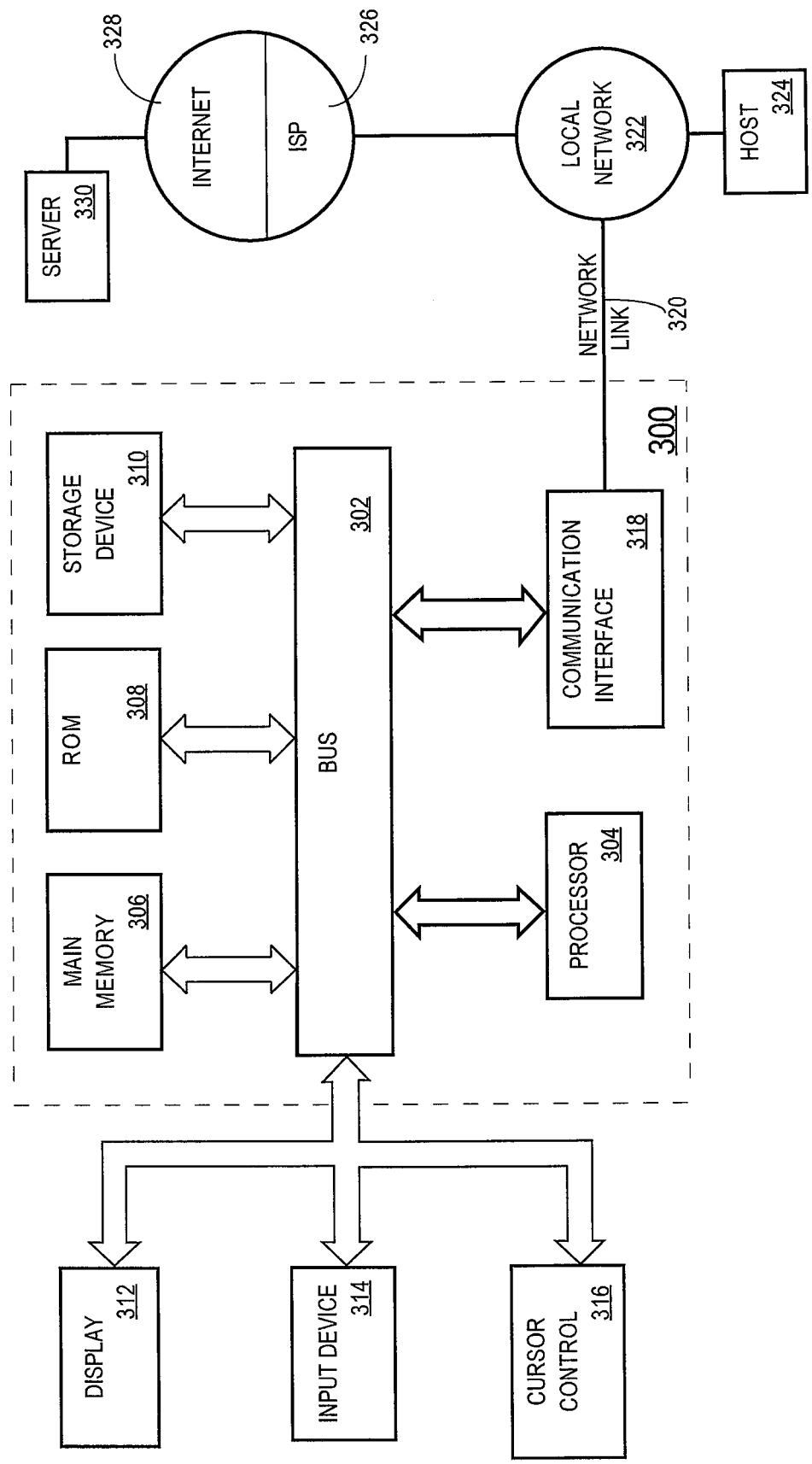
FIG. 3 is a block diagram illustrating a computer system that may be used in implementing an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   establishing a plurality of queues, wherein each queue is for a corresponding one of a plurality of blocks of a disk;
   while allowing non-blocking updates to the plurality of blocks by a plurality of concurrently running clients, attaining a consistency level relative to updates to the plurality of blocks by having each of the plurality of concurrently running clients initiate updates by storing, for each update to each given block of the plurality of blocks, a log record in the queue that corresponds to the given block, without updating the given block directly;
   wherein updates reflected in each given queue of the plurality of queues are applied to the corresponding block only after one of the plurality of concurrently running clients has obtaining a flushing lock on the given queue;
   wherein the plurality of concurrently running clients includes a first client and a second client;
   wherein the step of allowing non-blocking updates includes:
      without obtaining any lock on a block of the plurality of blocks, the first client writing a first log record to a queue associated with the block, wherein the first log record comprises first update information for a first pending update to the block on the disk;
      without obtaining any lock on the block, the second client writing a second log record to the queue, wherein the second log record comprises second update information for a second pending update to the block on the disk; and the first client flushing the queue, wherein flushing the queue comprises:
  obtaining a flushing lock on the queue, wherein obtaining the flushing lock grants the first client exclusive rights to apply updates, reflected in the queue, to a copy of the block;
  after obtaining the flushing lock, the first client
    applying a first update indicated in the first update information to the copy of the block;
    applying a second update indicated in the second update information to the copy of the block;
    writing the copy to the block on the disk; and
    releasing the flushing lock on the queue to enable another client, of the plurality of concurrently running clients, to subsequently obtain the flushing lock on the queue.

2. The method of claim 1, wherein the disk is a virtualized disk.

3. The method of claim 1, wherein the first client writing the first log record to the queue comprises:
  initiating writing a plurality of log records to the queue, wherein the first client crashes prior to completing writing the plurality of log records to the queue; and
  re-initiating writing the plurality of log records to the queue subsequent to restarting of the first client, wherein the first log record is written to the queue more than once.

4. The method of claim 1, further comprising:
  the second client writing a third log record to the queue concurrently with the first client flushing the queue.

5. The method of claim 1, wherein the plurality of clients includes a third client, and further comprising:
  the third client periodically flushing the queue, wherein the third client is only a reader of the queue.

6. The method of claim 1, wherein the first client flushing the queue is responsive to an occurrence of one or more of:
  a predetermined time from a previous flushing of the queue;
  a predetermined age of an oldest log record in the queue;
  a predetermined age of a last log record in the queue; or
  a predetermined size of the queue.

7. The method of claim 1, wherein the first client writing the first log record to the queue comprises:
  writing the first log record and a third log record to a client atomic queue; and
  sending all log records from the client atomic queue, including the first log record and the third log record, to the queue.

8. The method of claim 1, wherein a leaf node in an index-organized table comprises the block.

9. The method of claim 8, wherein the index-organized table is associated with a special queue for insert log records and delete log records for the index-organized table.

10. The method of claim 9, further comprising inserting a new record in the leaf node by the first client:
  obtaining a flushing lock on the special queue;
  traversing the index-organized table to identify the leaf node comprising the block for adding the new record based on an insert log record in the special queue;
  adding the new record to the leaf node comprising the block;
  deleting the insert log record from the special queue; and
  releasing the flushing lock on the special queue.

11. The method of claim 10, wherein adding the new record to the leaf node comprising the block comprises:
  determining that the leaf node has a maximum number of records;
  splitting the leaf node by adding an additional leaf node to the successor of the leaf node and transferring data in a portion of the block from the leaf node to the additional leaf node; and
  adding the new record to the leaf node or the additional leaf node.

12. The method of claim 9, further comprising deleting a record in the leaf node by the first client:
  obtaining a flushing lock on the special queue;
  traversing the index-organized table to identify the leaf node comprising the block that includes the record based on a delete log record in the special queue;
  deleting the record from the leaf node;
  subsequent to deleting the record from the leaf node, determining that the leaf node has no remaining records;
  responsive to determining that the leaf node has no remaining records, deleting the leaf node;
  deleting the delete log record from the special queue; and
  releasing the flushing lock on the special queue.

13. The method of claim 1, further comprising:
  when referenced records in a first write set for a first transaction are ready to be committed, determining whether referenced records in a second write set for a previously committed transaction overlap with referenced records in a first read set for the first transaction
  responsive at least to determining that the referenced records in the second write set for the previously committed transaction do not overlap with referenced records in the first read set for the first transaction:
  committing the first write set.

14. The method of claim 1, further comprising:
  when referenced records in a first write set for a first transaction are ready to be committed, determining whether referenced records in a second write set for a previously committed transaction overlap with referenced records in a first read set for the first transaction;
  responsive at least to determining that the referenced records in the second write set for the previously committed transaction overlap with referenced records in the first read set for the first transaction:
  discarding the first write set without committing the first write set.

15. The method of claim 1, wherein the first client flushing the queue comprises:
  identifying an out of order log record in the queue based on a timestamp of the out of order log record;
  deferring the out of order log record to a next flushing of the queue by flushing the log records in the queue with the exception of the out of order log record; and
  applying the out of order log record to the block on the disk during the next flushing of the queue.

16. The method of claim 1, further comprising:
  the first client recording a first timestamp associated with writing the first log record to the queue, wherein the first log record corresponds to a record in the block on disk;
  requesting and receiving the record in the block on the disk, wherein a second timestamp associated with the record indicates a last update to the record in the block on the disk;
  responsive to second timestamp being equivalent or later than the first timestamp, using the record received from the disk; and
  responsive to the second timestamp being prior to the first timestamp, re-requesting and re-receiving the record in the block.

17. The method of claim 1, further comprising:
recording a first timestamp at the beginning of a transaction, when an original timestamp of a data item is equivalent to the first timestamp or precedes the first timestamp;
subsequent to recording the first timestamp, reading the data item and a current timestamp of the data item;
comparing the first timestamp to the current timestamp of the data item;
responsive to the current timestamp of the data item not being subsequent to the first timestamp, using the data item in the transaction.

18. The method of claim 1, further comprising:
recording a first timestamp at the beginning of a transaction, when an original timestamp of a data item is equivalent to the first timestamp or precedes the first timestamp;
subsequent to recording the first timestamp, reading the data item and a current timestamp of the data item;
comparing the first timestamp to the current timestamp of the data item;
responsive to the current timestamp of the data item being subsequent to the first timestamp, undoing a portion of the transaction that has been completed, subsequent to the beginning of the transaction, based on an undo log record associated with the transaction.

19. The method of claim 1, further comprising:
comparing a write set of a first transaction, that has not been committed, to the write set of a second transaction, that has already been committed, to determine if there any overlapping log records with updates to the same record, wherein the first transaction began before the second transaction;
responsive to no overlapping log records with updates to the same record, committing the write set of the first transaction; and
responsive to overlapping log records with updates to the same record, discarding the write set of the first transaction.

20. The method of claim 1, further comprising:
reading a first read set for a first transaction and generating a first write set for the first transaction;
subsequent to generating the first write set, comparing the first read set to a second write set of a second transaction that was written subsequent to reading of the read set for the first transaction to determine if referenced record in the first read set overlaps with a referenced record in the second write set;
responsive to a referenced record in the first read set overlapping with the referenced record in the second write set, discarding the first write set of the first transaction; and
responsive to no referenced records from the first read set overlapping with the referenced records in the second write set, committing the first write set of the first transaction.

21. A non-transitory computer-readable storage medium storing one or more sequences of instructions which, when executed by one or more processors, causes the one or more processors to perform the method recited in claim 1.

22. A non-transitory computer-readable storage medium storing one or more sequences of instructions which, when executed by one or more processors, causes the one or more processors to perform the method recited in claim 2.

23. A non-transitory computer-readable storage medium storing one or more sequences of instructions which, when executed by one or more processors, causes the one or more processors to perform the method recited in claim 3.

24. A non-transitory computer-readable storage medium storing one or more sequences of instructions which, when executed by one or more processors, causes the one or more processors to perform the method recited in claim 4.

25. A non-transitory computer-readable storage medium storing one or more sequences of instructions which, when executed by one or more processors, causes the one or more processors to perform the method recited in claim 5.

26. A non-transitory computer-readable storage medium storing one or more sequences of instructions which, when executed by one or more processors, causes the one or more processors to perform the method recited in claim 6.

27. A non-transitory computer-readable storage medium storing one or more sequences of instructions which, when executed by one or more processors, causes the one or more processors to perform the method recited in claim 7.

28. A non-transitory computer-readable storage medium storing one or more sequences of instructions which, when executed by one or more processors, causes the one or more processors to perform the method recited in claim 8.

29. A non-transitory computer-readable storage medium storing one or more sequences of instructions which, when executed by one or more processors, causes the one or more processors to perform the method recited in claim 9.

30. A non-transitory computer-readable storage medium storing one or more sequences of instructions which, when executed by one or more processors, causes the one or more processors to perform the method recited in claim 10.

31. A non-transitory computer-readable storage medium storing one or more sequences of instructions which, when executed by one or more processors, causes the one or more processors to perform the method recited in claim 11.

32. A non-transitory computer-readable storage medium storing one or more sequences of instructions which, when executed by one or more processors, causes the one or more processors to perform the method recited in claim 12.

33. A non-transitory computer-readable storage medium storing one or more sequences of instructions which, when executed by one or more processors, causes the one or more processors to perform the method recited in claim 13.

34. A non-transitory computer-readable storage medium storing one or more sequences of instructions which, when executed by one or more processors, causes the one or more processors to perform the method recited in claim 14.

35. A non-transitory computer-readable storage medium storing one or more sequences of instructions which, when executed by one or more processors, causes the one or more processors to perform the method recited in claim 15.

36. A non-transitory computer-readable storage medium storing one or more sequences of instructions which, when executed by one or more processors, causes the one or more processors to perform the method recited in claim 16.

37. A non-transitory computer-readable storage medium storing one or more sequences of instructions which, when executed by one or more processors, causes the one or more processors to perform the method recited in claim 17.

38. A non-transitory computer-readable storage medium storing one or more sequences of instructions which, when executed by one or more processors, causes the one or more processors to perform the method recited in claim 18.

39. A non-transitory computer-readable storage medium storing one or more sequences of instructions which, when executed by one or more processors, causes the one or more processors to perform the method recited in claim 19.

40. A non-transitory computer-readable storage medium storing one or more sequences of instructions which, when executed by one or more processors, causes the one or more processors to perform the method recited in claim 20.

* * * * *